United States Patent
Lynch et al.

(10) Patent No.: US 9,148,819 B2
(45) Date of Patent: Sep. 29, 2015

(54) IN-PLACE A-MSDU AGGREGATION FOR WIRELESS SYSTEMS

(71) Applicants: Bradley R. Lynch, Toronto (CA); Joseph Andonieh, Aurora (CA)

(72) Inventors: Bradley R. Lynch, Toronto (CA); Joseph Andonieh, Aurora (CA)

(73) Assignee: Peraso Technologies, Inc., Toronto (CA)

( * ) Notice: Subject to any disclaimer, the term of this patent is extended or adjusted under 35 U.S.C. 154(b) by 218 days.

(21) Appl. No.: 13/669,512

(22) Filed: Nov. 6, 2012

(65) Prior Publication Data

US 2014/0126559 A1 May 8, 2014

(51) Int. Cl.
| | |
|---|---|
| H04W 28/06 | (2009.01) |
| H04L 12/879 | (2013.01) |
| G06F 3/06 | (2006.01) |
| G06F 12/08 | (2006.01) |
| H04L 1/18 | (2006.01) |
| H04L 1/16 | (2006.01) |

(52) U.S. Cl.
CPC .......... *H04W 28/065* (2013.01); *H04L 49/901* (2013.01); *G06F 3/0656* (2013.01); *G06F 12/0804* (2013.01); *H04L 1/1642* (2013.01); *H04L 1/1867* (2013.01)

(58) Field of Classification Search
CPC ................ G06F 2213/2802; G06F 12/0804; G06F 3/0656; H04L 49/901; H04L 1/1642; H04L 1/1867; H04W 28/065
USPC .......... 370/392–394; 710/306; 711/105, 114, 711/E12.078
See application file for complete search history.

(56) References Cited

U.S. PATENT DOCUMENTS

| | | | | |
|---|---|---|---|---|
| 7,149,213 | B1 * | 12/2006 | Rosner et al. | ................. 370/379 |
| 7,474,676 | B2 | 1/2009 | Tao et al. | |
| 7,839,845 | B2 * | 11/2010 | Stephens | ....................... 370/389 |
| 8,175,047 | B2 * | 5/2012 | Seok et al. | .................... 370/329 |
| 2007/0053354 | A1 | 3/2007 | Rudolph et al. | |
| 2009/0262739 | A1 * | 10/2009 | Lu | ................................. 370/392 |
| 2009/0296683 | A1 * | 12/2009 | Raju et al. | ...................... 370/349 |
| 2010/0061400 | A1 * | 3/2010 | Hong et al. | ................... 370/466 |
| 2010/0103914 | A1 * | 4/2010 | Tsao | ............................. 370/338 |
| 2014/0044111 | A1 * | 2/2014 | Nuti | .............................. 370/338 |

* cited by examiner

*Primary Examiner* — Xavier S. Wong (57) ABSTRACT

A sub-frame is generated for each MSDU to be aggregated in an A-MSDU and the sub-frame is stored in place in memory. For each sub-frame, an MSDU descriptor identifying the memory location of the sub-frame is stored in a queue. When a transmit opportunity for an MPDU arises, a DMA engine sequentially transfers the components of sub-frames stored in memory to a PHY layer using a list or other sequence of DMA descriptors obtained from at least a subset of the MSDU descriptors. Thus, these MSDU descriptors allow the aggregation of A-MSDUs to be initiated while the MSDUs are in place in the same memory in which they were initially stored.

15 Claims, 3 Drawing Sheets

IN-PLACE A-MSDU AGGREGATION FOR WIRELESS SYSTEMS

FIELD OF THE DISCLOSURE

The present disclosure relates generally to wireless communications and more particularly to encapsulation of data for wireless transmission.

BACKGROUND

Wireless network systems often employ encapsulation or other aggregations of frames so as to improve transmission performance. The Institute of Electrical and Electronic Engineers (IEEE) 802.11 standards provide for the aggregation of two or more medium access control (MAC) service data units (MSDUs) into a corresponding aggregated MAC service data unit (A-MSDU). MSDUs or A-MSDUs in turn are encapsulated in a MAC protocol data unit (MPDU). The IEEE 802.11 standards further provide for the aggregation of one or more MPDUs as a series of aggregated MAC protocol data units (A-MPDUs). In turn, a single MPDU or one or more A-MPDUs are encapsulated in a physical layer (PHY) protocol data unit (PPDU) that is wirelessly transmitted via the PHY of the transmitting device.

In order to provide A-MSDU aggregation, MSDUs typically are double-buffered, in that they are buffered across multiple software-managed queues by a software scheduler until there is a sufficient number of buffered MSDUs to create an A-MSDU. The software scheduler then copies the MSDUs into a single buffer (often called an A-MSDU buffer) and the MSDUs in this single buffer are then inserted into a separate hardware-managed first-in first-out (FIFO) queue. Thus, to create an A-MSDU, a software-implemented scheduler typically is required to queue and then de-queue multiple MSDUs from multiple software-managed queues into a single software-managed queue, and then transfer the created A-MSDUs in the single software-managed queue to the hardware-managed queue, as well as generate the headers necessary to separate the MSDUs within the A-MSDU. This process often impacts processor utilization due to the execution of the software scheduler necessary to manage the queuing and de-queuing of MSDUs between these queues, and thus can degrade transmission throughput.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

The following description is intended to convey a thorough understanding of the present disclosure by providing a number of specific embodiments and details involving encapsulation of frames for wireless transmission. It is understood, however, that the present disclosure is not limited to these specific embodiments and details, which are examples only, and the scope of the disclosure is accordingly intended to be limited only by the following claims and equivalents thereof. It is further understood that one possessing ordinary skill in the art, in light of known systems and methods, would appreciate the use of the invention for its intended purposes and benefits in any number of alternative embodiments, depending upon specific design and other needs. To illustrate, although the present disclosure describes techniques in the context of MSDUs and MPDUs, these techniques may be implemented for encapsulation of other types of frames or data units in accordance with the teachings provided herein.

FIGS. 1-4 illustrate example techniques for in-place A-MSDU aggregation through the use of a programmable direct memory access (DMA) engine that can affect multiple transfers to generate an A-MSDU within an MPDU. In at least one embodiment, the components of each A-MSDU sub-frame to be aggregated into a single frame for transmission are stored in-place in memory. These components can include, for example, one or more of a sub-frame header, an MSDU, and a pad value. In some embodiments, the sub-frame components may be further fragmented in memory. For example, the MSDU or the sub-frame header each may be stored as a plurality of packets or sub-components separately stored in memory. An upper-layer component operates to generate an MSDU descriptor for each A-MSDU sub-frame to be aggregated into the frame, whereby the MSDU descriptor includes metadata describing the corresponding MSDU sub-frame, and which also includes metadata identifying the locations in memory at which the corresponding sub-frame components are stored, and if the sub-frame components are fragmented in memory, identifying the locations in memory at which the fragmented sub-components are stored. The MSDU descriptors are stored in first-in first-out (FIFO) order in a queue associated with the stream or channel.

When a transmit opportunity (TXOP) arises for a frame of the stream or channel, an MDPU constructor programs the DMA engine based on sequences of DMA descriptors obtained from the MSDU descriptors from the queue in the FIFO order so as to access and transfer the MSDU sub-frame components from memory into a temporary PHY-layer buffer that serves to aggregate the multiple MSDU sub-frames into an A-MSDU. The sequence of one or more DMA descriptors obtained from a corresponding MSDU descriptor can include a list of DMA descriptors stored in the corresponding MSDU, or the MSDU can store memory location metadata for the memory locations of the sub-frame components, and a list of DMA descriptors can be dynamically generated or otherwise obtained from this memory location metadata. Alternatively, the DMA descriptors can be pre-configured and stored separately from the MSDU descriptors, and the DMA descriptors may be subsequently accessed based on one or more pointers or other location indicators stored in the MSDU descriptors, in a separate data structure, or as hardcoded in hardware. Moreover, a MAC header for the A-MSDU can be either accessed from memory by the DMA engine or dynamically generated, as can a frame check sequence (FCS). The MAC header is appended to the head of the A-MSDU and the FCS is appended to the tail of the A-MSDU, and the resulting MPDU may be provided to the physical (PHY) layer for transmission. By utilizing the MSDU descriptors to program a DMA engine to implement multiple transfers of MSDU sub-frames from memory, the aggregation of A-MSDUs into an MPDU may be initiated while the MSDUs are in place in memory, and thus rendering it unnecessary to use multiple corresponding software-managed queues to sequence A-MSDUs for aggregation in an MPDU.

Figure 1:
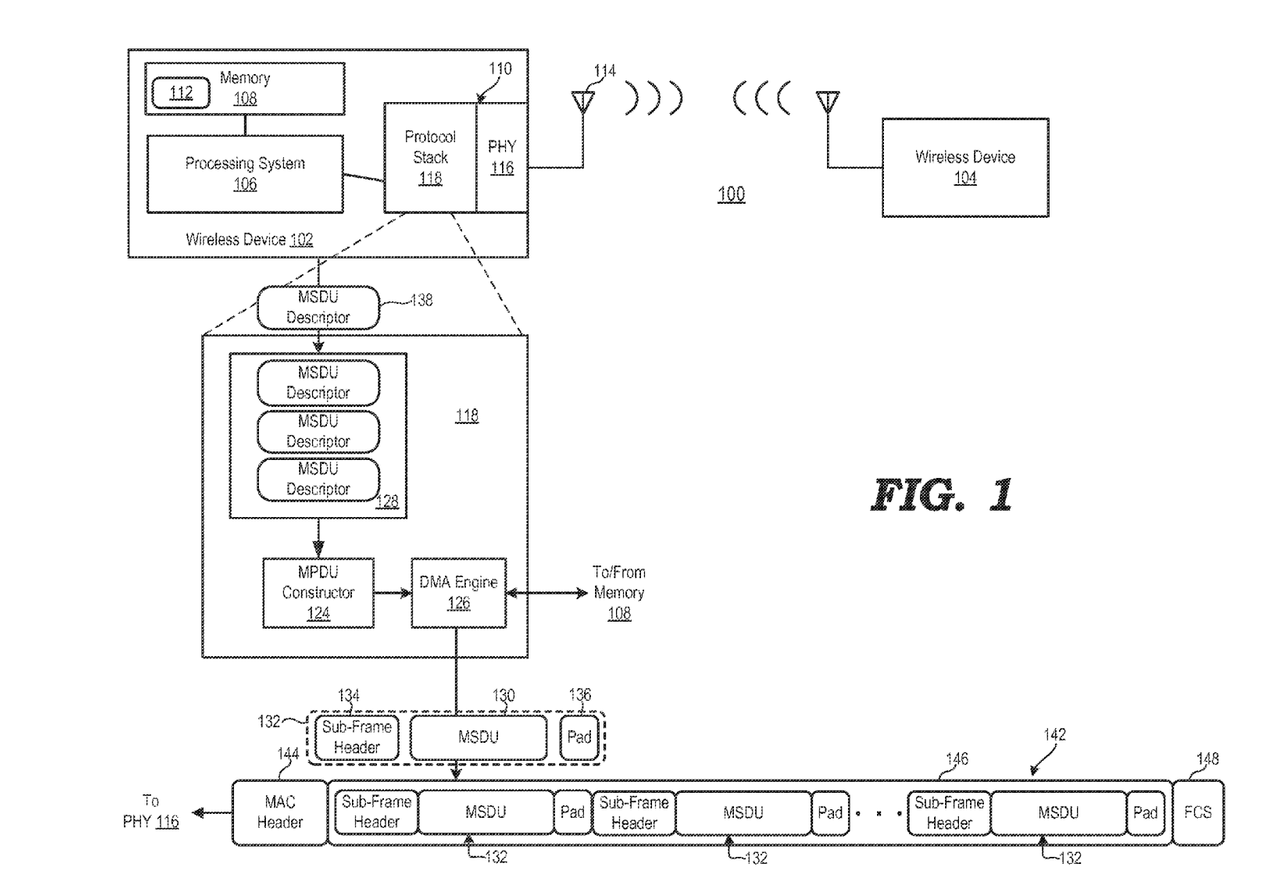
FIG. 1 is a block diagram illustrating a wireless communication system employing in-place A-MSDU encapsulation in accordance with at least one embodiment of the present disclosure.

FIG. 1 illustrates an example wireless communications system 100 in accordance with at least one embodiment of the present disclosure. The wireless communications system 100 includes a wireless device 102 and a wireless device 104 in wireless communication in accordance with any of a variety of wireless communication standards, such as one or more of the IEEE 802.11 standards (e.g., an 802.11n standard or 802.11ac standard). The wireless device 102 includes a processing system 106, a memory 108, and a wireless interface 110 (e.g., a radio frequency (RF) transceiver) implementing one or more network layers. The wireless device 104 can be configured in a similar manner.

The processing system 106 can include one or more processors and peripheral components (e.g., input/output devices, storage devices, etc.) to process data for transmission via the wireless interface 110 and to process data received via the wireless interface 110. The processing elements can include, for example, a central processing unit, a graphics processing unit, an application specific integrated circuit, a digital signal processor, and the like. The memory 108 can include, for example, system random access memory or flash memory, and stores software 112 executed by one or more processing elements of the processing system 106. The software 112 can include, for example, drivers or other software to provide the software-implemented functions of the wireless interface 110 described below.

The wireless interface 110 comprises one or more antennas 114 and network layers to format communications signaled via the antennas 114. The network layers implemented by the wireless interface 110 include a physical (PHY) layer 116 to conduct the physical signaling via the antenna 114 and a protocol stack 118 to control the transmission and reception of protocol data units (PDUs), also called frames, via the PHY layer 116. The PHY layer 116 comprises the circuitry to convert electrical signaling from the protocol stack 118 to RF signaling via the antenna 114, and convert RF signaling received via the antenna 114 to electrical signaling for processing by the protocol stack 118. The protocol stack 118 may be implemented via software or firmware (such as software 112) executed by one or more processors, as hardcoded logic, as programmable logic, or combinations thereof.

The protocol stack 118 implements one or more network protocols, such as an IEEE 802, and can include various protocol sub-layers, such as logical link control (LLC) sub-layer and media access control (MAC) layer. The LLC sub-layer can comprise, for example, a LLC sub-layer as promulgated by an IEEE 802.2 standard and the MAC layer can comprise, for example, a MAC sub-layer as promulgated by an IEEE 802.11 standard. In one embodiment, functionality of the LLC sub-layer is provided through the execution of software/firmware by hardware, such as the execution of software 112 by processing system 106, and functionality of the MAC layer is implemented via one or both of executed software/firmware and hardcoded/programmed logic In the depicted example, the protocol stack 118 includes an MPDU constructor 124, a direct memory access (DMA) engine 126, and one or more queues 128. Each queue 128 can correspond to, for example, a different transmission stream or channel, and comprises a randomly accessible memory (RAM) or other storage element to queue MSDU descriptors as described in greater detail herein. The MPDU constructor 124 facilitates the generation of MPDUs from aggregated A-MSDU sub-frames for wireless transmission, whereupon the generated MPDUs or A-MPDUs are encapsulated in PPDUs and wirelessly transmitted via the PHY layer 116. The MPDU constructor 124 may be implemented as software/firmware executed by a process, in hard-coded or programmable logic, or a combination thereof.

In operation, the processing system 106 provides transmit data (TX data) for a stream or channel to the protocol stack 118. The transmit data comprises one or more protocol data units, which the protocol stack formats as MSDUs 130. For each A-MSDU, the protocol stack 118 generates an A-MSDU sub-frame 132 (referred to herein as "sub-frame 132") having the MSDU 130, an A-MSDU sub-frame header 134 (referred to herein as "sub-frame header 134"), a pad value 136, or other components. As provided by the IEEE 802.11 standards, the sub-frame header 134 can include, for example, six octets for the destination MAC address, six octets for the source MAC address and two octets to store a length indicator. In this example, the pad value 136 can include between 0 and 3 octets.

As noted above, in a conventional approach MSDUs would be queued across multiple software-managed queues, and when it comes time to aggregate the sub-frames into an A-MSDU, the MSDUs for the sub-frames would have to be de-queued from the one software-managed queue, aggregated and then en-queued into a second software-managed queue. In at least one embodiment, the wireless device 102 reduces or eliminates this need for double-buffering of sub-frames by maintaining each sub-frame in place in memory until it is time to transmit the MSDUs, at which point the aggregation is handled primarily though hardware—that is, the DMA engine 126. Accordingly, as the protocol stack 118 generates a sub-frame 132, the components of the sub-frame 132 are stored in a memory, such as the memory 108. In one embodiment, the components of a sub-frame 132 are stored contiguously (e.g., in the same memory location or in contiguously-addressed memory locations). In other embodiments, the components of a sub-frame may be stored in a discontiguous manner.

Likewise, the sub-frames 132 for a stream or channel are not required to be stored in a contiguous manner in the memory 108. Accordingly, to enable the sub-frames 132 to be aggregated in order from their non-ordered in-place locations in the memory 108, the MDPU constructor 124 or other component of the protocol stack 118 programs the DMA engine 126 so as to access the sub-frames 132 in the desired order for transfer into a PHY-level buffer for encapsulation into an MPDU. To this end, the protocol stack 118 generates an MSDU descriptor 138 for each sub-frame 132, whereby the MSDU descriptor 138 contains parameters and other information that identifies the various components of the corresponding sub-frame 132, as well as identifies or describes various parameters for these sub-frame components. These parameters can include, for example, a pointer or other indicator of the memory location of a corresponding sub-frame component, a data size indicator for the corresponding sub-frame component, and the like. The MSDU descriptors 138 then are used to provide for DMA descriptors (not shown in FIG. 1) that program or otherwise enable the DMA engine 126 to access the components of the corresponding sub-frame 132 from the memory 108 to aggregate during transmission the sub-frames 132 for a new MPDU 142. In one embodiment, the MSDU descriptors 138 provide for the DMA descriptors used by the DMA engine 126 to transfer the components of a sub-frame 132 in that a sequence of one or more DMA descriptors is stored in the MSDU descriptor 138 for the corresponding sub-frame 132. That is, the DMA descriptors are part of the MSDU descriptors 138 in this embodiment. In other embodiments, the MSDU descriptors 138 provide for the DMA descriptors in that the MSDU descriptors 138 store memory location metadata used by the protocol stack 118 to separately generates one or more lists or other sequences of DMA descriptors used to transfer the components of a sub-frame 132.

To illustrate, in an implementation whereby the components of a sub-frame are stored contiguously in the memory 108, the MSDU descriptor 138 can include (or enable the generation of), for example, a DMA descriptor comprising a pointer to the first memory location storing the first word of the sub-frame header 134 and a data size that represents the total size of the sub-frame header 134, the MSDU 130, and the pad value 136. In this example, the DMA descriptor can be used by the DMA engine 126 to directly access and transfer the entire sub-frame 132 as a single block of data from the memory 108. In an implementation whereby the components are not required to be stored contiguously, the MSDU descriptor 138 can include (or enable the generation of), for example: a first DMA descriptor comprising a first pointer to the memory location storing the sub-frame header 134 and an indicator of the size of the sub-frame header 134; a second DMA descriptor comprising a second pointer to the memory location storing the MSDU 130 and an indicator of the size of the MSDU 130; and a third DMA descriptor comprising a third pointer to the memory location storing the pad value 136 and an indicator of the size of the pad value 136. Moreover, in certain instances, one or more of the components themselves may be fragmented. For example, the MSDU 130 may be stored as four separate sub-components, each sub-component having a corresponding DMA descriptor to identify its location in memory.

Further, the DMA descriptors may have, for example, pointers to the next DMA descriptor in the ordered "list" of DMA transfers so as to form a linked list of DMA descriptors (e.g., the first DMA descriptor points to the second DMA descriptor and the second DMA descriptor points to the third DMA descriptor). In this example, the first, second, and third DMA descriptors included in, or generated from, the MSDU descriptor 138 can be used to program the DMA engine 126 to directly access and transfer each component of the sub-frame as a separate block of data from the memory 108. Although a linked list is one example of the organization of the DMA descriptors, the DMA descriptors may be organized in any of a variety of data structures that enables a corresponding access sequence, such as an indexed array, a first-in first-out (FIFO) queue, and the like. For ease of illustration, the structure providing for a sequence of DMA descriptors is referred to herein as "the list of DMA descriptors."

The protocol stack 118 implements a queue 128 for each stream or channel supported by the wireless device 102. As the protocol stack 118 generates an MSDU descriptor 138, the protocol stack 118 queues the MSDU descriptor 138 in the queue 128 associated with the corresponding stream or channel. In at least one embodiment, the MSDU descriptors 138 for a stream or channel are queued in a first-in first-out (FIFO) order so that the DMA engine 126 accesses the sub-frames 132 from the memory 108 in the order in which their corresponding MSDU descriptors 138 are stored in the queue 128.

When there is a transmit opportunity (TXOP) for a given frame of a given stream or channel, the protocol stack 118 initiates a new MPDU 142 by programming the MPDU constructor 124 with the intended size of the resulting MPDU and by directing the MPDU constructor 124 to provide a MAC header 144 for the MPDU 142. In one embodiment, the MAC header 144 may have been previously generated by the protocol stack 118, and thus its location in the memory 108 is denoted in the first MSDU descriptor 138 in the queue 128. Accordingly, in this scenario, the MPDU constructor 124 or other component of the protocol stack 118 accesses the first MSDU descriptor 138 in the queue 128 and provides a DMA descriptor to the DMA engine 126, which programs the DMA engine 126 to locate and access the MAC header 144 from the memory 108 and transfer it to the PHY 116. In this instance, the DMA descriptor could have been stored as part of the first MSDU descriptor 138 in the queue 128 or the MPDU constructor 124 can dynamically create the DMA descriptor from the corresponding information for the MAC header 144 contained in the first MSDU descriptor 138. Alternatively, the DMA descriptor may have been previously generated and stored and the MSDU descriptor 138 may include a pointer or other location indicator to the DMA descriptor. In another embodiment, the MPDU constructor 124 dynamically generates the MAC header 144 based on information provided by the protocol stack 118.

After providing the MAC header 144, the MPDU constructor 124 and the DMA engine 126 collaborate to transfer a specified number of sub-frames 132 from the memory 108 to a payload 146 of the MPDU 142. In one embodiment, the MSDU descriptors 138 already contain the DMA descriptors used to program the DMA engine 126, in which case the MPDU constructor 124 sequences through MSDU descriptors 138 in order in the queue 128 to access the DMA descriptors in each MSDU descriptor 138 in sequence, and uses the metadata represented by each accessed DMA descriptor to program the DMA engine 126 to locate and access the memory location(s) of the memory 108 that store the corresponding components of a corresponding sub-frame 132. The first sub-frame 132 accessed for the MPDU 142 is appended to the end of the MAC header 144 and each subsequent sub-frame 132 transferred from the memory 108 by the DMA engine 126 using the corresponding one or more DMA descriptors is then appended to the end of the previously-accessed sub-frame 132 in the payload 146.

In other embodiments, the MPDU constructor 124 dynamically programs one or more entries of the list of DMA descriptors based on the metadata stored in the MSDU descriptors 138. In this case, the MPDU constructor 124 accesses the first MSDU descriptor 138 in the queue and uses the metadata stored therein to generate one or more DMA descriptors used by the DMA engine 126 to fetch the components of the corresponding sub-frame 132 from the memory 108 for transfer to the next position in the payload 146. As noted above, the components of a sub-frame 132 may be stored contiguously in memory and thus the MPDU constructor 124 may need only a single DMA descriptor to program the DMA engine 126 to access the entire sub-frame 132 as a single block of data. In other implementations, the components of a sub-frame 132 (or the sub-components of a component) may be stored in separate memory locations, in which case the MPDU constructor 124 may create multiple sequences of DMA descriptors to program the DMA engine 126 to separately access and transfer each component of the sub-frame 132 in turn. For example, the MPDU constructor 124 may use the metadata of a MSDU descriptor 138 to generate: a first DMA descriptor to fetch the A-MSDU sub-frame header 134, a second DMA descriptor to fetch the MSDU 130, and a third DMA descriptor to fetch the pad value 136. In one embodiment, the MPDU constructor 124 may link these multiple DMA descriptors by including in each DMA descriptor a pointer to the next DMA descriptor in the sequence so as to generate a linked list of DMA descriptors in this example. The DMA engine 126 thus may run through the linked list of DMA descriptors in order so as to affect the transfer of the components of the sub-frame 132 in the specified order to the payload 146. In other embodiments, the sequence of DMA descriptors may be generated using another structure, such as a FIFO queue or an indexed table. In the case of a fragmented sub-frame component, a sequence of DMA descriptors may be used to program the DMA engine 126 to separately access and transfer each sub-component in turn to assemble the complete component.

When the specified number of sub-frames 132 has been aggregated in the payload 146, the MPDU constructor 124 generates a frame check sequence (FCS) value 148 and appends the FCS value 148 to the end of the payload 146, thereby completing the MPDU 142. The MPDU 142 can be separately encapsulated in a PPDU during wireless transmission, or the MPDU 142 can be aggregated with one or more other MPDUs 142 in an A-MPDU during wireless transmission.

The order in which the DMA engine 126 accesses sub-frames 132 from the memory 108 for transfer to the payload 146 of the MPDU 142 is controlled by the order in which the MSDU descriptors 138 are queued in the queue 128, and each MSDU descriptor 138 includes, or is used to generate, a corresponding list of one or more DMA descriptors that operate as a pointer or other memory location indicator to the in-place storage location of the sub-frame 132 in the memory 108. As such, the sequence of MSDU descriptors 138 in the queue 128 provides, in effect, the order in which the the DMA engine 126 transfers the corresponding sub-frames 132 from the memory 108 into the payload 146 of the MPDU 142 without requiring an intermediary queue or buffer to store the sub-frames 132 in a separate queue before being aggregated into an MPDU. Thus, the programming of the DMA engine 126 via DMA descriptors stored in, or generated from, the MSDU descriptors 138 permits in-place aggregation of A-MSDU sub-frames from the memory 108 in a manner that requires fewer software queuing resources.

Figure 2:
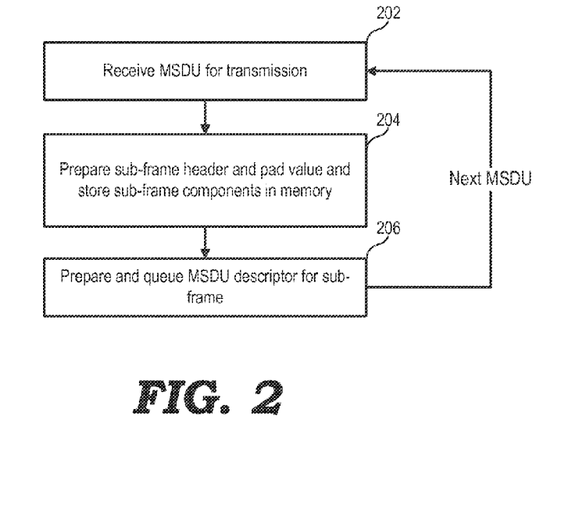
FIG. 2 is a flow diagram illustrating an example method for generating a list of MSDU descriptors used to program a direct memory access (DMA) engine to transfer in-place sub-frame data from a memory to a physical (PHY) layer buffer for constructing an MPDU in accordance with at least one embodiment of the present disclosure.

FIG. 2 illustrates an example of a process by which the protocol stack 118 generates the list of MSDU descriptors 138 for sub-frames 132 stored in-place in memory 108. In this example, the process initiates at block 202, whereby the protocol stack 118 receives an MSDU 130 for transmission in association with a stream or channel from a higher layer in the software stack. In response, at block 204 the protocol stack 118 generates an A-MSDU sub-frame 132 for the MSDU 130 by preparing a sub-frame header 134 and a pad value 136 for the MSDU 130 and provides the MSDU 130, the sub-frame header 134, and the pad value 136 for storage in the memory 108. In other embodiments, rather than generating the pad value 136 at this point, the MPDU constructor 124 instead can generate the pad value 136 on the fly after the DMA engine 126 has accessed the sub-frame header 134 and the MSDU 130 from memory. As noted above, these sub-frame components can be stored contiguously in memory 108, or may be stored in independent locations in memory 108. To enable the DMA engine 126 to locate the generated sub-frame 132 from the memory 108, the protocol stack 118 prepares, at block 206, an MSDU descriptor 138 that includes metadata that references the components of the sub-frame 132. In one embodiment, this metadata includes one or more DMA descriptors used to program the DMA engine 126 to directly access and transfer the stored components of the sub-frame 132. In one embodiment, the MSDU descriptor 138 includes a single DMA descriptor that includes a single pointer that points to the memory location of the sub-frame 132 and a size indicator of the sub-frame 132 in instances whereby the sub-frame components are stored contiguously in memory. Alternatively, in instances whereby the sub-frame components can be separately stored in memory, the MSDU descriptor 138 can include a DMA descriptor for each sub-frame component, each DMA descriptor comprising a memory location pointer and size indicator for the corresponding sub-frame component and a pointer to the next DMA descriptor. In other embodiments, this metadata describes various parameters for the components, such as their location in memory 108, their size, their type (e.g., sub-frame header, MSDU, pad value), and the MPDU constructor 124 subsequently generates the corresponding one or more DMA descriptors from this information. The protocol stack 118 then queues the generated MSDU descriptor in the queue 128 for the corresponding stream or channel. The process of blocks 202, 204, and 206, is repeated for the next MSDU in the stream or channel.

Figure 3:
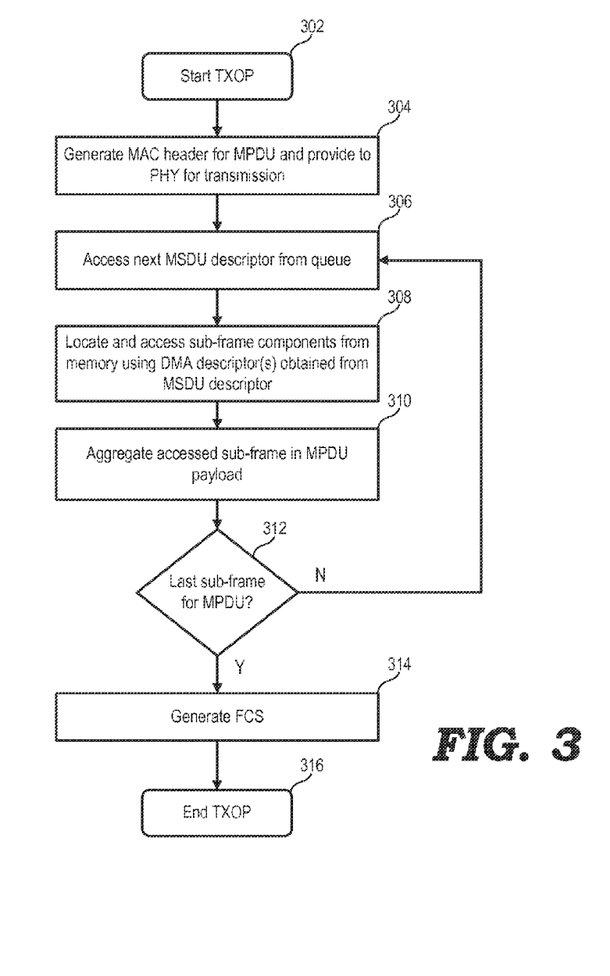
FIG. 3 is a flow diagram illustrating an example method for constructing an MPDU through DMA transfers of sub-frame data from a memory using MSDU descriptors in accordance with at least one embodiment of the present disclosure.

FIG. 3 illustrates an example of a process by which the DMA engine 126 and the MPDU constructor 124 generate an MPDU 142 by aggregating A-MSDU sub-frames 132 using the MSDU descriptors 138 queued in the queue 128. In this example, the process initiates at block 302, whereby a higher-layer component signals a TXOP to the protocol stack 118. In response, at block 304 the protocol stack 118 generates a MAC header 144 to initiate a new MPDU 142 and provides the MAC header 144 to the PHY 116 for transmission. In one embodiment, the MPDU constructor 124 is programmed to generate the MAC header 144 using configuration information supplied by, another component of the protocol stack 118. In another embodiment, the MAC header 144 constitutes one of the components of each sub-frame stored in memory and the first MSDU descriptor 138 in the queue 128 includes a DMA descriptor pointing to the MAC header 144 (or includes metadata used by the MPDU constructor 124 to generate the DMA descriptor pointing to the MAC header 144). The MPDU constructor 124 thus uses the first MSDU descriptor 138 in the queue 128 to program the DMA engine 126 to locate and access the MAC header 144 from the memory.

At block 306, the MPDU constructor 124 accesses the next MSDU descriptor 138 from the queue 128 and at block 308 the metadata of the accessed MSDU descriptor 138 is used to program or otherwise control the DMA engine 126 so as to locate and access the corresponding sub-frame components from the memory 108. As noted above, the metadata can include one or more DMA descriptors comprising pointers or other indicators of the memory locations storing the sub-frame components, as well as other indicia that may be needed by the DMA engine 126 to effect a data transfer, such as the sizes of the sub-frame components. If the sub-frame components of a sub-frame 132 are stored separately, the DMA descriptors for the sub-frame 132 may be implemented as a list of DMA descriptors. For example, the list could be implemented as a linked list with each DMA descriptor including a pointer to the next DMA descriptor in the list. In other embodiments, the MPDU constructor 124 dynamically generates a list of one or more DMA descriptors based on the sub-frame component metadata stored in the accessed MPDU descriptor 138.

At block 310, the MPDU constructor 124 sequences through the list of one or more DMA descriptors for the sub-frame 132, whereby for each DMA descriptor the MPDU constructor 124 programs the DMA engine 126 to access the corresponding sub-frame component(s) from memory and append the accessed sub-frame components to the end of the MAC header 144 (if the first sub-frame in the payload 146) or to the end of the previously-accessed sub-frame (if the second or subsequent sub-frame in the payload 146). At block 312, the MPDU constructor 124 determines whether the specified number of sub-frames 132 have been aggregated in the payload 146 of the MPDU 142. This number may be fixed or otherwise hardcoded, or may be programmed via a higher-level component. If fewer than the specified number of sub-frames 132 have been aggregated, the MPDU constructor 124 selects the next MSDU descriptor 138 in the queue 128 and the process of blocks 306, 308, 310, and 312 repeats. Otherwise, if the specified number of sub-frames has been aggregated, at block 314 the MPDU constructor 124 generates the FCS value 148 for the MPDU 124 and appends the FCS value 148 to the end of the payload 146. Upon transmission of the resulting MPDU 124, the TXOP ends at block 316.

Figure 4:
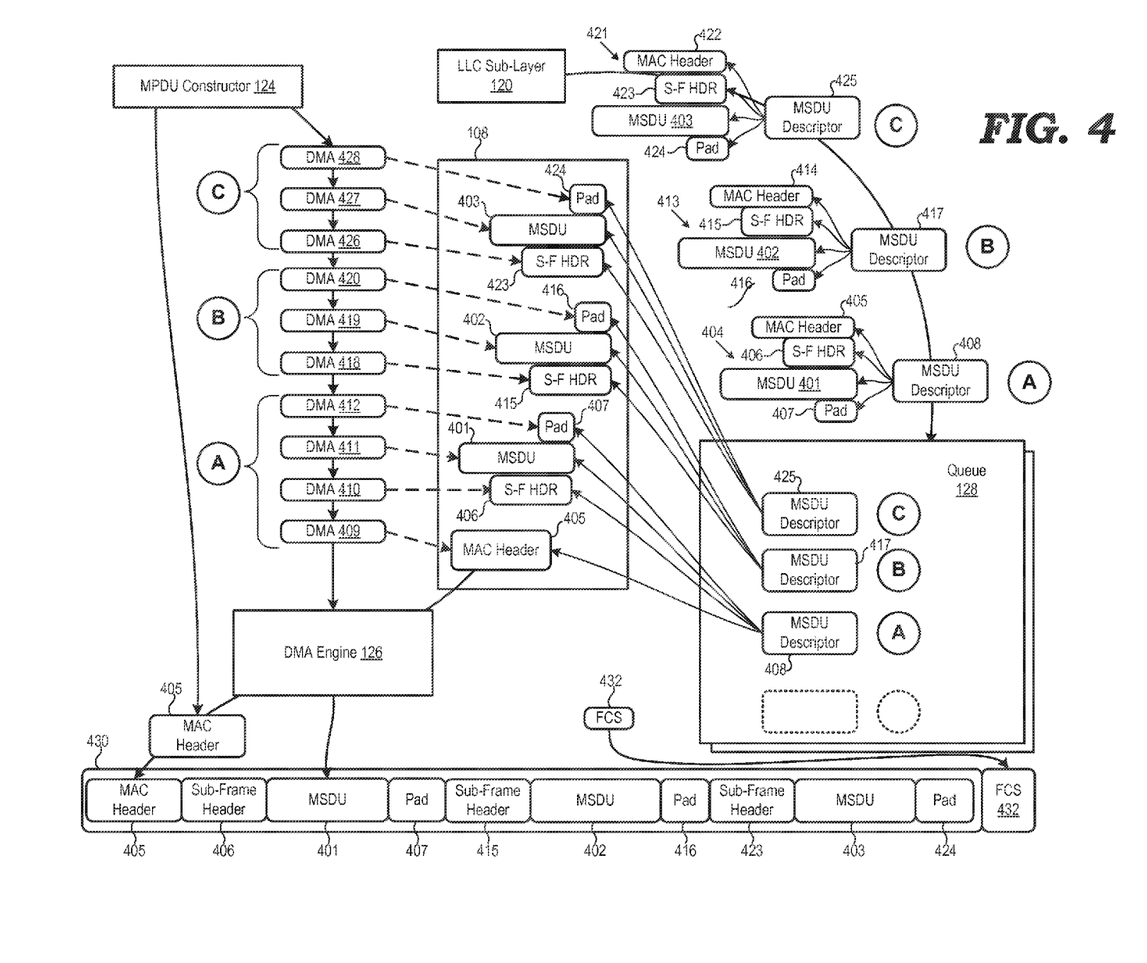
FIG. 4 is an example operation of the methods of FIGS. 2 and 3 in accordance with at least one embodiment of the present disclosure.

FIG. 4 illustrates an example implementation of the processes of FIGS. 2 and 3 in accordance with at least one embodiment of the present disclosure. In the depicted example, the protocol stack 118 receives three MSDUs, denoted MSDUs 401, 402, and 403, in sequence from a higher-layer component. In response to receiving the MSDU 401, the protocol stack 118 creates a sub-frame 404 by generating a MAC header 405, a sub-frame header 406 (also denoted "S-F HDR"), and a pad value 407 and storing these sub-frame components at various locations in the memory 108. The protocol stack 118 also generates an MSDU descriptor 408 for the sub-frame 404 and stores the MSDU descriptor 408 in the queue 128.

For the following, it is assumed that the MSDU descriptors 408 includes the DMA descriptors. However, as noted above, the lists of DMA descriptors instead may be generated dynamically by the MPDU constructor 124 based on the metadata of the MSDU descriptor, or the DMA descriptors may have been previously generated and stored separate from the MSDU descriptors 408. Moreover, it is assumed for this example that each sub-frame component is stored whole (that is, not fragmented with separately stored/located sub-components). Thus, in this example, the MSDU descriptor 408 includes a DMA descriptor 409 that identifies the memory location and size of the MAC header 405, a DMA descriptor 410 that identifies the memory location and size of the sub-frame header 406, a DMA descriptor 411 that identifies the memory location and size of the MSDU 401, and a DMA descriptor 412 that identifies the memory location and size of the pad value 407. In one embodiment, the list of DMA descriptors is implemented as linked list and thus the DMA descriptor 409 further includes a pointer to the DMA descriptor 410, the DMA descriptor 410 includes a pointer to the DMA descriptor 411, and the DMA descriptor 411 includes a pointer to the DMA descriptor 412, thereby forming a linked list of DMA descriptors representing a corresponding A-MSDU sub-frame.

In response to receiving the MSDU 402, the protocol stack 118 creates a sub-frame 413 by generating a MAC header 414, a sub-frame header 415, and a pad value 416 and storing these sub-frame components at various locations in the memory 108. The protocol stack 118 also generates an MSDU descriptor 417 for the sub-frame 413 and stores the MSDU descriptor 417 in the queue 128 in sequence behind the MSDU descriptor 408. In this example, the MSDU descriptor 417 includes a DMA descriptor (not shown) that identifies the memory location and size of the MAC header 414, a DMA descriptor 418 that identifies the memory location and size of the sub-frame header 415, a DMA descriptor 419 that identifies the memory location and size of the MSDU 402, and a DMA descriptor 420 that identifies the memory location and size of the pad value 416. The DMA descriptor 418 further includes a pointer to the DMA descriptor 419 and the DMA descriptor 419 includes a pointer to the DMA descriptor 420, thereby forming a list of DMA descriptors representing a corresponding A-MSDU sub-frame.

In response to receiving the MSDU 403, the protocol stack 118 creates a sub-frame 421 by generating a MAC header 422, a sub-frame header 423, and a pad value 424 and storing these sub-frame components at various locations in the memory 108. The protocol stack 118 also generates an MSDU descriptor 425 for the sub-frame 421 and stores the MSDU descriptor 425 in the queue 128 in sequence behind the MSDU descriptor 417. The MSDU descriptor 425 includes a DMA descriptor (not shown) that identifies the memory location and size of the MAC header 422, a DMA descriptor 426 that identifies the memory location and size of the sub-frame header 423, a DMA descriptor 427 that identifies the memory location and size of the MSDU 403, and a DMA descriptor 428 that identifies the memory location and size of the pad value 424. The DMA descriptor 426 further includes a pointer to the DMA descriptor 427 and the DMA descriptor 427 includes a pointer to the DMA descriptor 428, thereby forming a list of DMA descriptors representing a corresponding A-MSDU sub-frame.

In response to a TXOP, the MPDU constructor 124 accesses the first MSDU descriptor in the queue 128, which in this example is the MSDU descriptor 408. The MPDU constructor 124 then sequences through the DMA descriptors 409-412 contained therein to program the DMA engine 126 to conduct a series of memory accesses to transfer the corresponding sub-frame components from the memory 108 to an MPDU 430. In this example, this series of memory accesses includes the DMA engine 126 accessing the MAC header 405 from the memory 108 using the DMA descriptor 409 to initiate the MPDU 430 and then aggregating the sub-frame 404 in the payload of the MPDU 430 by transferring the sub-frame header 406, the MSDU 401, and the pad value 407 from their respective locations in the memory 108 using the DMA descriptors 410, 411, and 412, respectively.

After completing processing of the MSDU descriptor 408, the MPDU constructor 124 accesses the next MSDU descriptor in the queue 128, which is MSDU descriptor 417, and then sequences through the list of DMA descriptors stored therein. The first DMA descriptor in the MSDU descriptor 417 points to the MAC header 414, but because the MAC header 405 has already been transferred to the MPDU 430, the MPDU constructor 124 ignores this first DMA descriptor. The MPDU constructor 124 then programs the DMA engine 126 to transfer the sub-frame 413 to the payload of the MPDU 430 by transferring the sub-frame header 415, the MSDU 402, and the pad value 416 from their respective locations in the memory 108 using DMA descriptors 418, 419, and 420, respectively.

After completing processing of the MSDU descriptor 417, the MPDU constructor 124 accesses the next MSDU descriptor in the queue 128, which is MSDU descriptor 425, and sequences through its list of DMA descriptors. The first DMA descriptor in the MSDU descriptor 425 points to the MAC header 422, and thus is ignored by the MPDU constructor 124. The MDPU constructor 124 processes the remaining DMA descriptors of the MSDU descriptor 417 to transfer the sub-frame 421 to the payload of the MPDU 430 by programming the DMA engine 126 to transfer the sub-frame header 423, the MSDU 403, and the pad value 424 from their respective locations in the memory 108 using DMA descriptors 426, 427, and 428, respectively.

In this example, the payload of the MPDU 430 is complete with three sub-frames. Accordingly, after transferring the pad-value 424 to the payload, the MPDU constructor 124 calculates an FCS value 432 for the MPDU 430 and appends the FCS value 432 to the end of the payload, thereby completing the MPDU 430.

As FIG. 4 illustrates, the programming of the DMA engine 126 to directly transfer sub-frames stored in-place in memory to the PHY 116 in a specified order based on a list of one or more DMA descriptors stored in, or otherwise obtained from, MSDU descriptors or another representative data structure allows MSDUs or A-MSDUs to be aggregated into an MPDU without the use of double-buffering or numerous software-managed queuing resources, thereby providing a more-efficient and less-resource constrained approach to data transmission in wireless networks.

Much of the inventive functionality and many of the inventive principles described above are well suited for implementation with or in software programs or instructions and integrated circuits (ICs) such as application specific ICs (ASICs). It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts according to the present invention, further discussion of such software and ICs, if any, will be limited to the essentials with respect to the principles and concepts within the preferred embodiments.

It will be appreciated that the methods and the user interface device described herein may include one or more conventional processors and unique stored program instructions that control the one or more processors, to implement, in conjunction with certain non-processor circuits, some of the functions of the user interface device described herein. The non-processor circuits may include, but are not limited to, wireless transmitter and receiver circuits, signal drivers, clock circuits, power source circuits, sensor circuits, and the like.

In this document, relational terms such as first and second, and the like, may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element. The term "another", as used herein, is defined as at least a second or more. The terms "including" and/or "having", as used herein, are defined as comprising. The term "coupled", as used herein with reference to electro-optical technology, is defined as connected, although not necessarily directly, and not necessarily mechanically. The term "program", as used herein, is defined as a sequence of instructions designed for execution on a computer system. A "program", or "computer program", may include a subroutine, a function, a procedure, an object method, an object implementation, an executable application, an applet, a servlet, a source code, an object code, a shared library/dynamic load library and/or other sequence of instructions designed for execution on a computer system.

The specification and drawings should be considered as examples only, and the scope of the disclosure is accordingly intended to be limited only by the following claims and equivalents thereof. Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. In a device comprising a wireless interface, a method comprising:
   storing a plurality of sub-frames in a memory of the device, each sub-frame comprising a media access control service data unit (MSDU) as a component and a sub-frame header as a component, wherein the sub-frame header and the MSDU for each sub-frame are stored in separate locations of the memory; and
   generating a media access control protocol data unit (MPDU) for wireless transmission by sequentially transferring at least the MSDU and the sub-frame header of each of the plurality of sub-frames from the memory for aggregation in the MPDU using a plurality of queued MSDU descriptors, each queued MSDU descriptor providing a first direct memory access (DMA) descriptor identifying a memory location of the corresponding sub-frame header and for a second DMA descriptor identifying an indicator of a memory location of the corresponding MSDU.

2. The method of claim 1, wherein each sub-frame further comprises a pad value.

3. The method of claim 1, further comprising:
   for each sub-frame of the plurality of sub-frames:
      storing the sub-frame header of the sub-frame in the memory;
      storing the MSDU of the sub-frame in the memory; and
      queuing a corresponding MSDU descriptor in the queue, the MSDU descriptor providing for the first DMA descriptor and the second DMA descriptor of the corresponding MSDU.

4. In a device comprising a wireless interface, a method comprising:
   storing a plurality of sub-frames in a memory of the device, each sub-frame comprising a media access control service data unit (MSDU) as a component;

generating a media access control protocol data unit (MPDU) for wireless transmission by sequentially transferring the plurality of sub-frames from the memory for aggregation in the MPDU using a plurality of queued MSDU descriptors, each MSDU descriptor identifying a memory location of at least one component of a corresponding sub-frame;

wherein the MSDU is stored as a plurality of sub-components at separate locations in the memory; and the plurality of MSDU descriptors include a direct memory access (DMA) descriptor for each sub-component, the DMA descriptor identifying the memory location of the corresponding sub-component.

5. The method of claim 1, wherein the plurality of sub-frames is aggregated in the MPDU in an order based on a sequence of the plurality of MSDU descriptors in a queue.

6. The method of claim 5, further comprising:

providing a media access control (MAC) header to a physical (PHY) layer of the wireless interface to initiate the MPDU; and sequentially transferring the plurality of sub-frames from the memory for aggregation in the MPDU comprises:

for each MSDU descriptor in sequence:

performing a direct memory access (DMA) to a memory location identified from the MSDU descriptor to obtain the MSDU stored at the memory locations; and providing the obtained sub-component to the PHY layer for aggregation in a payload of the MPDU.

7. The method of claim 6, wherein the memory locations identified from the MSDU descriptor comprises at least one of: a memory location identified by a DMA descriptor stored in the MSDU descriptor; and a DMA descriptor determined based on location information stored in the MSDU descriptor.

8. In a wireless device, a method comprising:

for each media access control service data unit (MSDU) of a plurality of MSDUs:

storing a sub-frame in a memory, the sub-frame comprising a sub-frame header and the MSDU, wherein the sub-frame header and the MSDU of each sub-frame are stored at different locations in the memory; and storing an MSDU descriptor in a queue, the MSDU descriptor providing for a first direct memory access (DMA) descriptor identifying a memory location storing the sub-frame header and a second DMA descriptor identifying a memory location storing the MSDU.

9. The method of claim 8, further comprising:

providing a MAC layer header to initiate a MAC protocol data unit (MPDU); and for each MSDU descriptor of at least a subset of the MSDU descriptors stored at the queue:

accessing the MSDU descriptor from the queue to identify a memory location associated with a sub-frame associated with the MSDU descriptor; and performing a direct memory access to transfer at least one component of the sub-frame from the memory location to a payload of the MPDU.

10. The method of claim 9, wherein:

accessing the MSDU descriptor from the queue to identify the memory location associated with the sub-frame comprises at least one of: accessing a sequence of DMA descriptors stored in the MSDU descriptor, the sequence including at least the first and second DMA descriptors; and dynamically generating the sequence of DMA descriptors based on memory location information stored in the MSDU descriptor; and performing the direct memory access to transfer at least one component comprises sequencing through the sequence of DMA descriptors to initiate a sequence of direct memory accesses to transfer components of the sub-frame from the memory location to the payload of the MPDU.

11. The method of claim 9, wherein providing the MAC layer header comprises:

accessing a first MSDU descriptor in the queue to identify a memory location storing the MAC layer header; and performing a direct memory access to transfer the MAC layer header from the memory location storing the MAC layer header to the payload of the MPDU.

12. A wireless device comprising:

a memory to store a plurality of media access control service data units (MSDU) sub-frames, each sub-frame comprising at least an MSDU and a sub-frame header stored at separate locations of the memory;

a queue to store a plurality of MSDU descriptors, each MSDU descriptor providing for a first direct memory access (DMA) descriptor identifying a memory location storing the sub-frame header and a second DMA descriptor identifying a memory location storing the MSDU of a corresponding sub-frame; and a direct memory access (DMA) engine coupled to the queue, the DMA engine to generate an MPDU for wireless transmission by sequentially transferring the sub-frame header and the MSDU for each sub-frame of at least a subset of the plurality of sub-frames from the memory for aggregation in the MPDU using at least the first and second DMA descriptors obtained from at least a subset of the plurality of queued MSDU descriptors.

13. The wireless device of claim 12, wherein, for each sub-frame of the plurality of sub-frames, the wireless device is to:

store a sub-frame header of the sub-frame in the memory;

store the MSDU of the sub-frame in the memory; and queue a corresponding MSDU descriptor in the queue, the MSDU descriptor providing for the first and second DMA descriptors.

14. The wireless device of claim 12, wherein the DMA engine aggregates the plurality of sub-frames in the MPDU in an order based on a queue order of the plurality of MSDU descriptors.

15. The wireless device of claim 14, further comprising:

a media access control (MAC) layer to provide a MAC header to a physical (PHY) layer of a wireless interface to initiate the MPDU; and the DMA engine is to sequentially transfer the plurality of sub-frames from the memory for aggregation in the MPDU by:

for each MSDU descriptor in sequence:

performing a direct memory access (DMA) to a memory location identified by a DMA descriptor obtained from the MSDU descriptor to obtain the MSDU stored at the memory location; and providing the obtained MSDU to the PHY layer for aggregation in a payload of the MPDU.

\* \* \* \* \*